United States Patent [19]
Schmidt

[11] 3,812,273
[45] May 21, 1974

[54] METHOD FOR THE MECHANICAL PREPARATION OF INDIVIDUAL CUPS OF FILTERED COFFEE

[75] Inventor: Ernst Georg Ferdinand Heinrich Schmidt, Buntentorsteinweg, Germany

[73] Assignee: Joh. Jacobs & Company, Breman, Germany

[22] Filed: June 9, 1972

[21] Appl. No.: 261,455

[30] Foreign Application Priority Data
June 11, 1971 Germany.............................. 2129070

[52] U.S. Cl. ................................... 426/433, 99/295
[51] Int. Cl. .............................................. A23f 1/08
[58] Field of Search............ 99/71, 71.1, 171 P, 295, 99/295; 426/433

[56] References Cited
UNITED STATES PATENTS
2,968,560  1/1961  Goros ............................. 99/295 X
3,295,998  1/1967  Goros ............................. 99/295 X
2,899,886  8/1959  Rodth ............................. 99/295

FOREIGN PATENTS OR APPLICATIONS
1,564,088  3/1968  France

Primary Examiner—Frank W. Lutter
Assistant Examiner—William L. Mentlik
Attorney, Agent, or Firm—Sughrue, Rothwell, Mion, Zinn & Macpeak

[57] ABSTRACT

The deposit of a suitable coin in a vending machine initiates the delivery of a sealed coffee pack from a revolving magazine, via a chute, to a conveyor table. The pack is advanced by a belt and a sealing sheet removed from the bottom of the pack. The pack is then advanced to a brewing station where a plurality of pointed nozzles are lowered to pierce the pack from above and deliver hot water thereto. The freshly brewed coffee exits the pack through a bottom filter and flows through a funnel into a coffee cup beneath the funnel. The spent pack is then advanced to a disposal chute where it is compacted and dropped into a waste tray.

5 Claims, 9 Drawing Figures

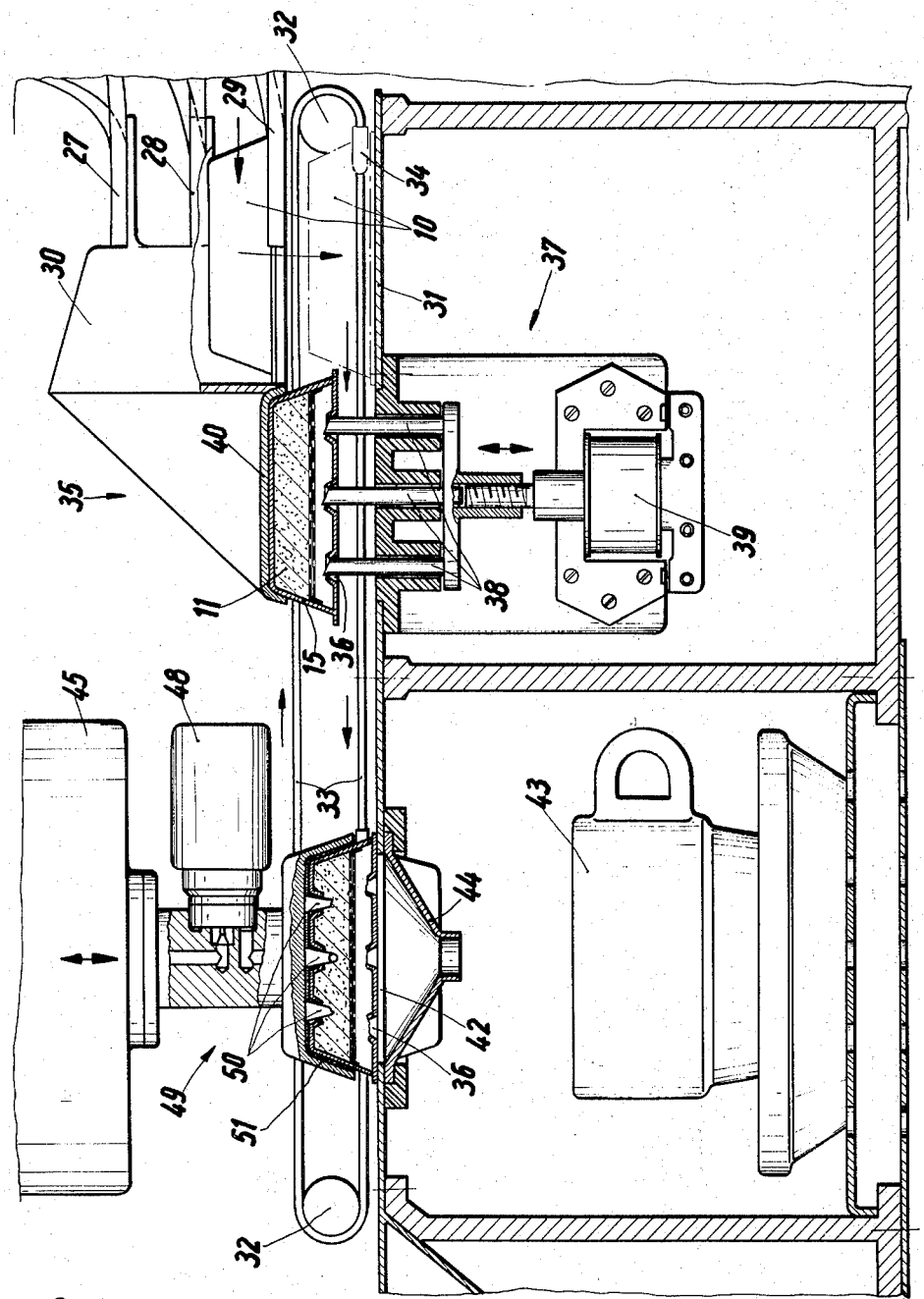

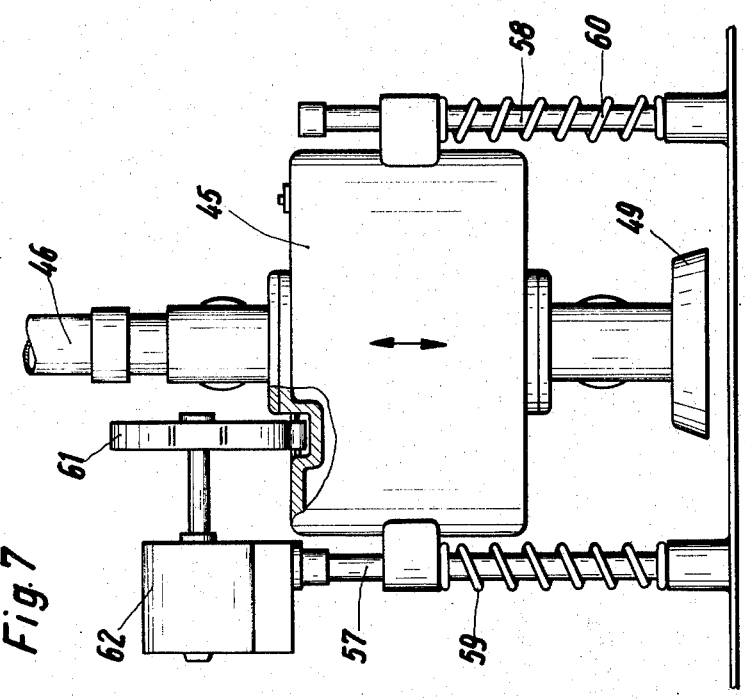
Fig.7
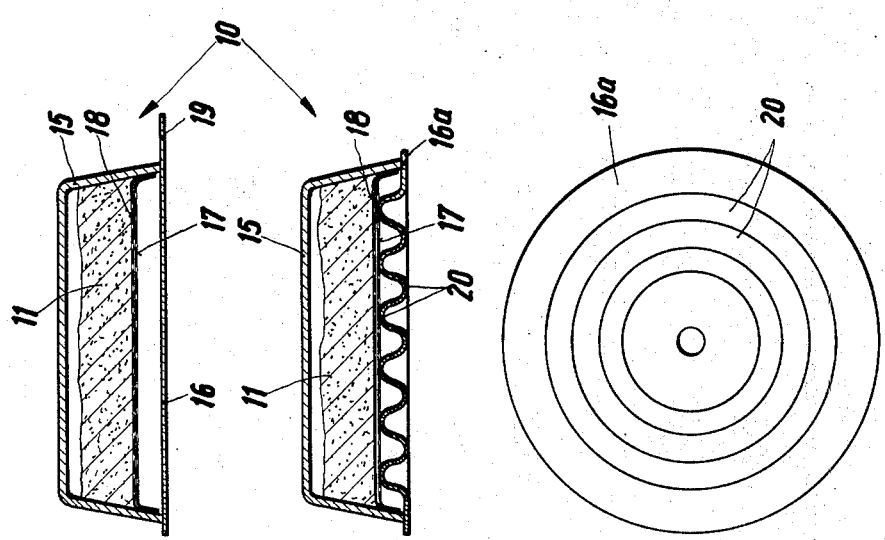
Fig.4
Fig.5
Fig.6

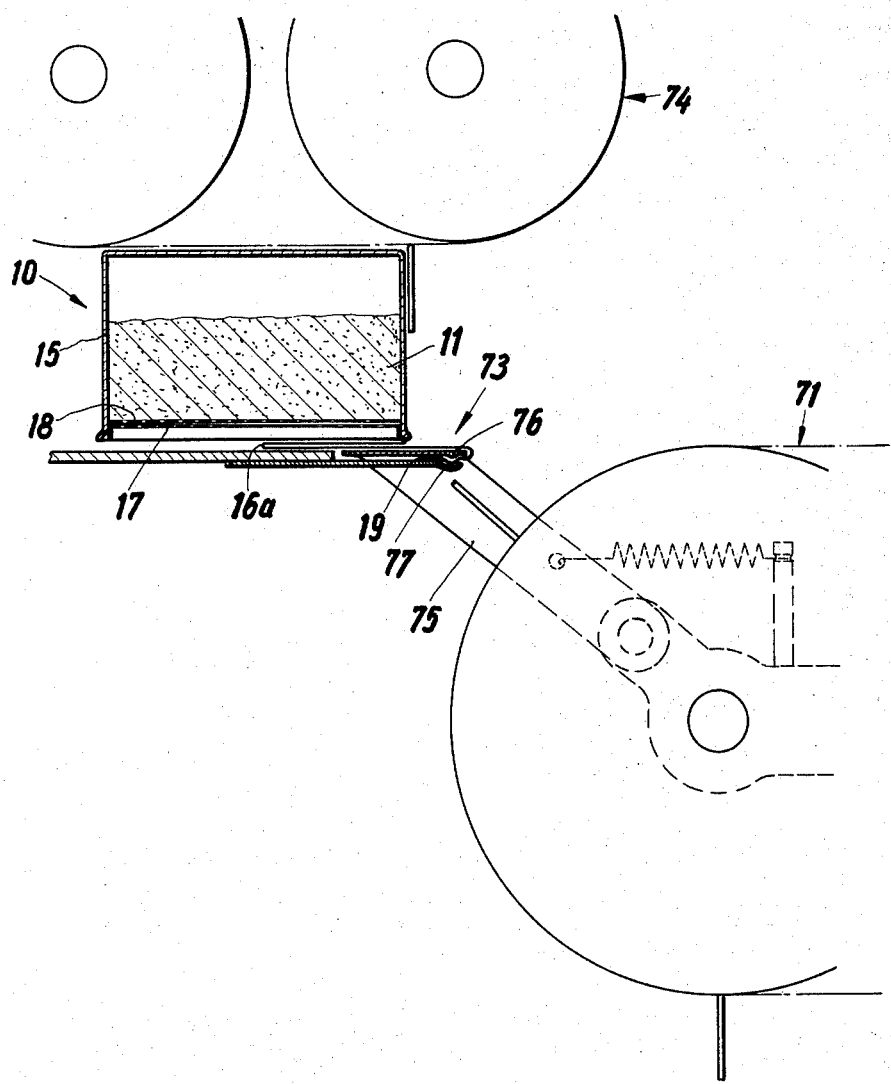

3,812,273

METHOD FOR THE MECHANICAL PREPARATION OF INDIVIDUAL CUPS OF FILTERED COFFEE

BACKGROUND OF THE INVENTION

1. Field of the Invention

The invention relates to a method and apparatus for the mechanical preparation of individual portions of a filtered coffee beverage made from ground roast coffee in a machine provided with a hot water heater.

The object of the invention is to make it possible to prepare individual portions of filtered coffee, fully automatically, in a machine, while at the same time retaining as far as possible the freshness and, in particular, the aroma of the coffee. The invention is primarily for use in coin operated automats.

2. Description of the Prior Art

In the known automatic coffee machines the coffee is prepared in large quantities and kept ready for use in appropriate storage containers. The individual portions of prepared coffee are removed from the storage container as required. A considerable loss of aroma is unavoidable in the course of this process.

SUMMARY OF THE INVENTION

The process according to the invention for producing filtered coffee beverages is characterized in that individual aroma-sealed packs, each containing a sufficient amount of the ground roast coffee for one beverage, are stored in the machine. The individual packs for preparing a cup of coffee are called upon as required and are conveyed to a preparation unit.

In accordance with the present invention, a beverage which is ordered, for example, by the insertion of a coin, is prepared immediately before it is delivered. Furthermore, it is prepared from a portion of ground roast coffee sufficient for one cup. The portion of ground roast coffee was stored in an aromasealed pack in the machine up to the time of preparing the beverage. The coffee thus retains its aroma to a maximum during preparation of a beverage.

The process according to the invention is as follows: In the preparation unit holes are made in the pack or in the walls thereof. On the upper side of the pack, holes are made for the introduction of hot water. Holes for discharging the prepared beverage are made in the bottom of the pack. The hot water flows from above — preferably under pressure — downwards through the pack provided with holes. In the meantime a container such as a cup is placed under the pack. This receives the liquid coffee coming directly from the pack retaining the roast coffee.

A machine for implementing the process according to the invention is provided with one or more magazines for receiving a considerable number of packs containing different types of coffee. It is also provided with a preparation unit and a hot water heater.

BRIEF DESCRIPTION OF THE DRAWINGS

Further details of the invention will now be provided with reference to the examples of embodiments represented in the drawings, in which:

FIG. 3 is a diagrammatic side elevation of the preparation unit of the device, likewise on an enlarged scale.

FIG. 4 is a cross-sectional view of a pack containing ground roast coffee for use in the process according to the invention.

FIG. 5 is another embodiment of a pack, likewise in cross-section.

FIG. 6 shows the pack according to FIG. 5, from below.

FIG. 7 is a view at right angles to that of FIG. 1 of the height adjustable hot water heater arrangement on an enlarged scale.

FIG. 9 is a detail of this device on an enlarged scale.

DESCRIPTION OF THE PREFERRED EMBODIMENTS

Figure 1:
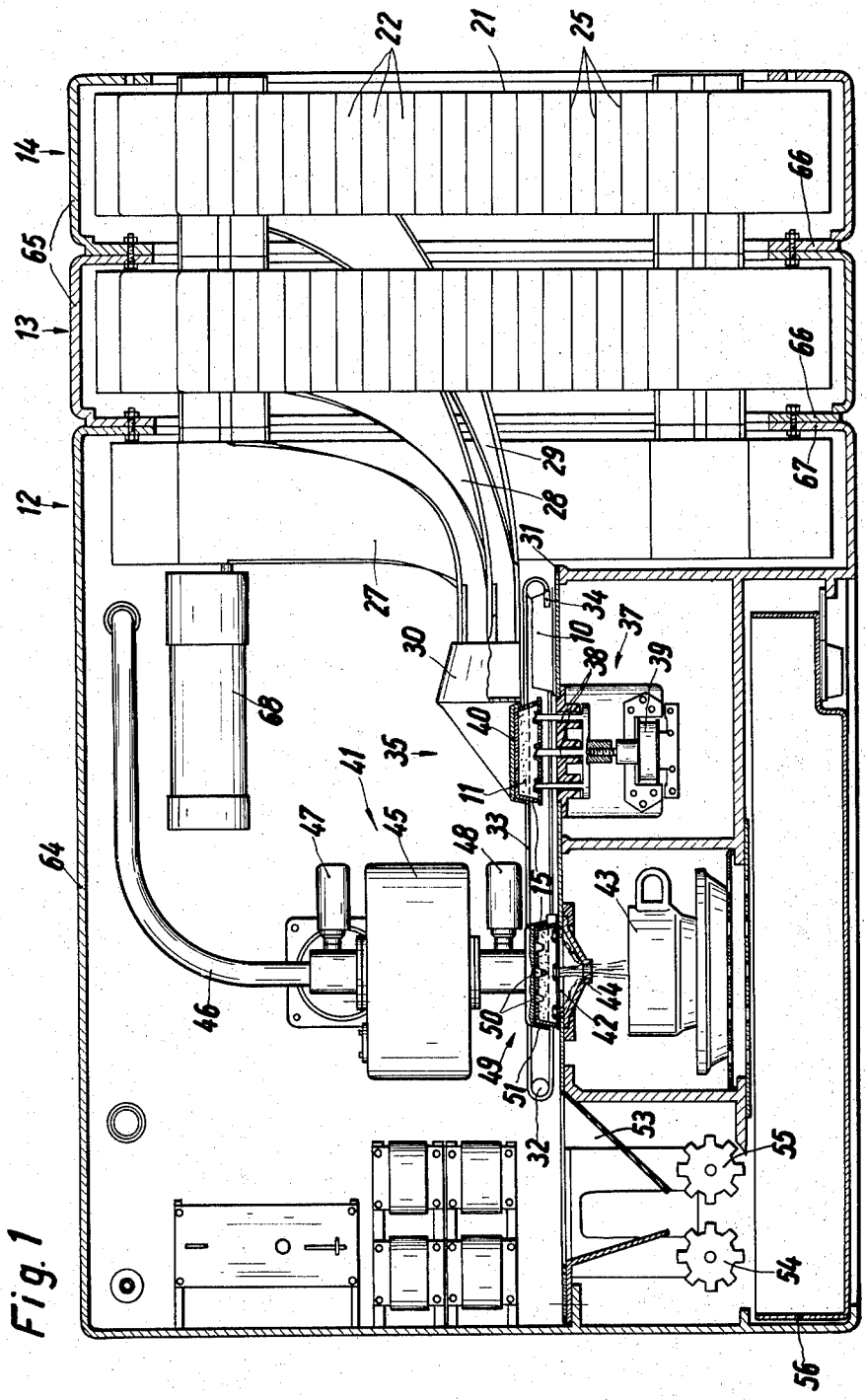
FIG. 1 is a diagrammatic side elevation of an embodiment of the device according to the invention (when the machine housing is open).

Individual aroma sealed closed packs 10 (FIGS. 4, 5 and 6) serving to hold a measured amount of ground roast coffee 11, are essential to the invention. The quantity of roast coffee 11, contained in a pack 10, is used to produce a specific amount of coffee, for example, one cup, which is consumed immediately. A plurality of these packs 10 containing different types of coffee ("mild blend," "caffeine free") may be stored ready for use in several magazines 12, 13, 14 in the machine. The roast coffee 11 remains in the respective pack 10 until the coffee is prepared. To prepare the coffee, the pack 10 is partly destroyed so that hot water can get into the pack 10 to the roast coffee 11 and the prepared beverage is discharged at the bottom of the pack 10.

The pack 10 consists of a container 15 produced by the deep draw process from plastics material or another aroma-sealed material. During preparation of the beverage the open, downwardly facing side is closed off by a sealing sheet 16, for example, of aluminum. A filter layer, more particularly, a filter paper 17 is mounted within the container 15 at a distance from the sealing sheet. During preparation of the coffee the filter paper 17 is disposed below the roast coffee 11. In addition, a water permeable supporting sheet, for example, a perforated aluminum sheet 18, may be mounted on the side facing the roast coffee 11. The sealing sheet 16 may be provided with a projecting lug 19 for gripping said sheet.

The pack 10 according to FIGS. 5 and 6 is in principle constructed in the same way as the one shown in FIG. 4. The sealing sheet 16a is provided with molded wave-shaped elevations 20 and corresponding depressions, which may be concentric, i.e., in rings, or parallel to one another. The elevations 20 support the filter paper 17 and serve to stiffen the sealing sheet 16a.

Figure 2:
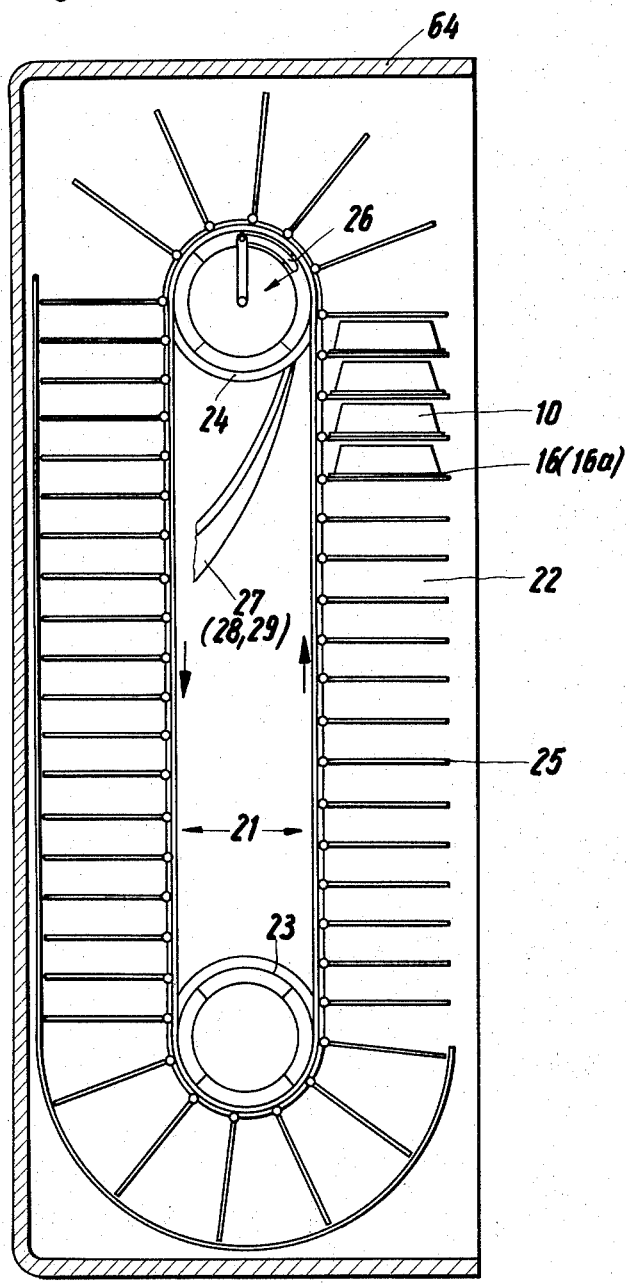
FIG. 2 shows a part of the device, i.e., a magazine, on an enlarged scale.

The magazines 12, 13 and 14, adapted to receive a number of the packs 10, are each provided in the embodiment of FIGS. 1 and 2 with an upright gradually circulating cellular belt 21 which has a plurality of cells 22, each receiving a pack 10. The cellular belt 21 is guided above and below about two guide rollers 23 and 24, which are disposed a distance apart from one another. The cells 22 consist of base plates 25, disposed apart from one another. The packs 10 are disposed on these base plates with their sealing sheets 16 or 16a facing downwards. In the reorientation area by the upper guide roller, the packs 10 slide radially inwards and a fixedly mounted support plate 26 disposed between the lateral guide rollers 24 folds inwards as soon as the pack 10 located in a cell 22 in the region of this support plate 26 is required for use.

The pack 10, which is required for use falls inwards into the space enclosed by the cellular belt 21 and onto a conveyor, that is, onto an inclined and possibly coiled chute 27. A chute of this kind 27, 28 and 29 is provided for each magazine 11, 12 and 13. The lower ends of these chutes open into a collector. In the embodiment shown, this is a collector pipe. This collector pipe 30, which is open at the bottom, receives the incoming pack and guides it down onto a conveyor table 31. The pack 10 lies on the conveyor table with the sealing sheet 16 or 16a facing downwards.

A conveyor 32, which is shown in the embodiment of FIG. 1 as a circulating belt 33 immediately above the conveyor table 31, takes over the transportation of the pack. The circulating belt 33 is provided with lateral engaging members 34 projecting into the region of the conveyor table 31. Each pack is gripped at the back by an engaging member 34 and is moved along on the conveyor table 31.

The pack 10 moves from below the collecting pipe 30 to a punching area 35 where openings, i.e., discharge openings 36 (see FIG. 3) are made in the sealing sheet 16 or 16a.

In the embodiment represented, a punching tool 37 is provided for making the discharge openings 36 for the prepared beverage. This punching tool is provided with a plurality of mandrels 38 distributed on a common support. These are raised by a lifting element, for example an electromagnet 39, from below to above the level of the conveyor belt 31. The pack 10 is also raised until it rests in a bell-shaped overhang 40 mounted above the conveyor table 31. During a further upward movement the mandrels penetrate the sealing sheet 16 or 16a. However, they do not penetrate as far as the filter paper which is disposed some distance above the sealing sheet.

After the punching tool 37 has been lowered, the pack 10 provided with the discharge holes 36 is conveyed to a brewing area 41. In this brewing area 41 the pack is fixed above an opening 42 in the conveyor table 31. A vessel, for example a cup 43, is placed under this opening 42 to receive the prepared coffee. In this way, the coffee issuing from the discharge openings 36 can proceed directly via a funnel 44 into the cup 43.

A hot water heater 45 in the form of a continuous flow heater is provided in the brewing area, to produce the coffee beverage. The hot water heater in the form of a continuous flow heater operates in such a way that the water for preparing a drink of coffee is always obtained via a flexible supply line 46 from the mains and not from a storage container in the machine. An electromagnetic intake valve 47 and a corresponding discharge valve 48 coordinate with the hot water heater 45. These valves 47 and 48 regulate the supply of water to the continuous flow heater and the removal of water therefrom.

A distributor head 49 is mounted on the underside of the hot water heater 45. This distributor head is provided with a plurality of downwardly pointing nozzles, the ends of which are sharpened or pointed. By moving the distributor head 49 downwards, more particularly, together with the hot water heater 45, the ends of the nozzles 50 penetrate the walls of the container 15 into the pack 10. The hot water, which may be under pressure, can now pass through the nozzles 50 which are provided with a plurality of discharge openings into the inside of the pack 10 to the roast coffee.

The distributor head 49 is provided with a bell shaped supporting feed head 51 which fits about the container 15. An elastic, compressible, supple, tightening layer is preferably disposed on the inside of this supporting feed head 51. This tightening layer prevents liquid from leaking out of the top of the container 15 when the nozzles 50 enter it or when the hot water is poured in.

The water entering the pack 10 via the nozzles 50 passes through the roast coffee 11, then through the aluminum sheet 18, and then through the filter paper 17. As prepared coffee it passes from the pack 10 via the discharge openings 36 of the sealing sheet 16 or 16a into the cup 43 placed in position below. The supply of water can be so regulated that after the introduction of the nozzles 50 into the pack 10, only a fraction of the requisite amount of water is passed through at first and the remainder is introduced after a "brewing period."

After the requisite amount of water has passed or penetrated through, the distributor head 49 is raised with the hot water heater 45 from the pack 10. This pack is moved into a discharge funnel 53 leading to a crushing mill consisting of two crushing cylinders 54 and 55. The used packs 10 are compressed to a smaller volume by these crushing cylinders 54 and 55, before falling into a collecting tray 56 which is adapted to be removed from the machine.

The hot water heater 45 and the distributor head 49 are mounted so as to be vertically adjustable on two lateral guide rods 57, 58 and are adapted to be lowered against the loading of the compression springs 59, 60. To effect this lowering movement a cam plate 61 with a recess is provided. The cam plate is driven by a motor 62 and abuts against a counter roller of the hot water heater 45. The recess of the cam plate 61 marks the upper position of the hot water heater 45. The rotational speed of the cam plate 61 is such that during one rotation of the cam plate 61 the drink can be produced.

The machine housing is constructed in a special way. A machine housing 64, preferably of polyurethane and constructed in one piece, is already equipped with one magazine 12. The other magazines, 13, 14, which may possibly be required, are in separate, individual, magazine casings 65. These casings are also made of plastics material. The identical magazine casings 65 have open sides and inwardly projecting flanges 66 in the region of the lateral surfaces. The magazine casings 65 are releasably attached to each other by means of this flange 66 and to a corresponding flange 67 on the machine housing 64. All magazines or cellular belts 21 are driven by a common motor 68.

Figure 8:
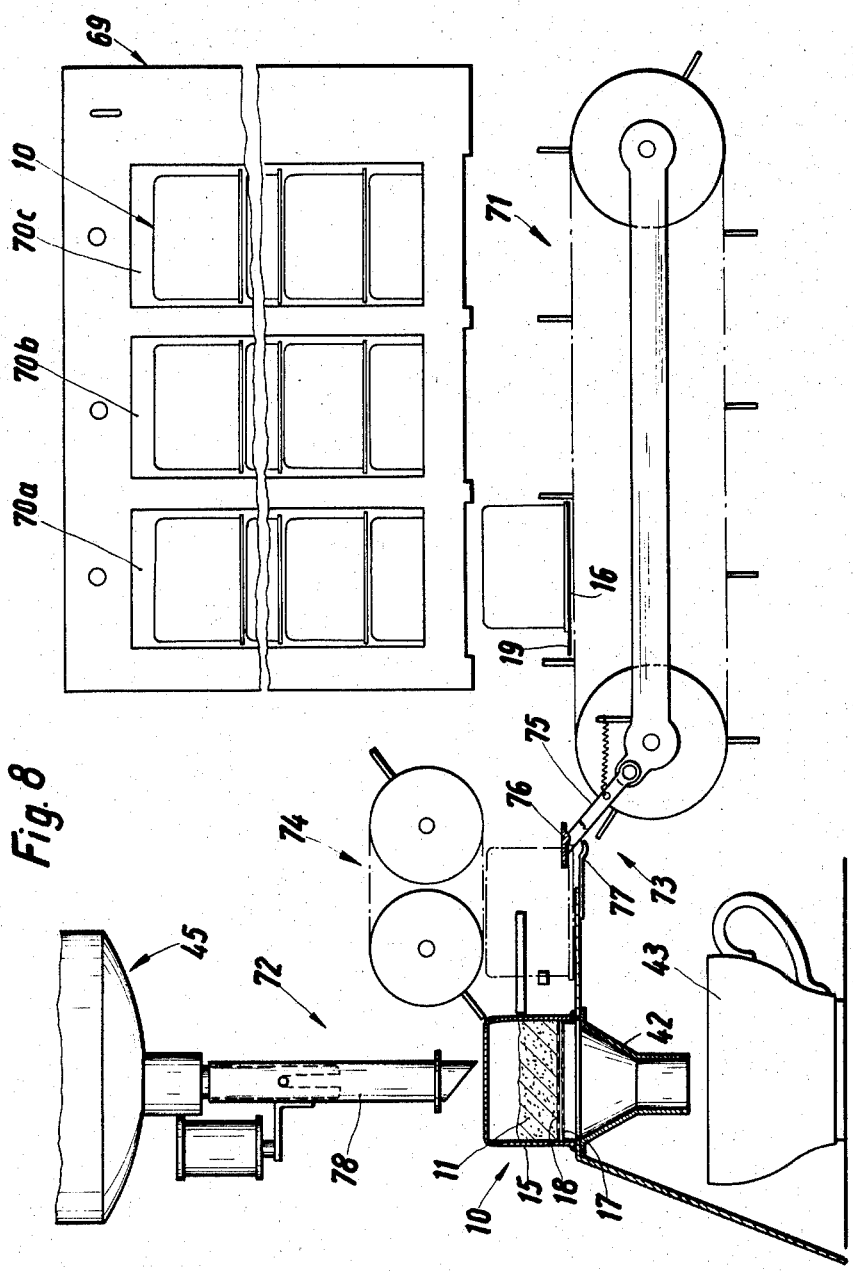
FIG. 8 is also a diagrammatic side elevation of another embodiment of the device according to the invention.

The device according to FIGS. 8 and 9 corresponds in its basic construction and method of operation to the device according to FIGS. 1 to 3. The packs 10 are kept ready for use in a magazine 69 having a plurality of compartments 70a, 70b, 70c. The pack 10, which is to be used, arrives at a conveyor 71, which transports the pack 10 in the direction of the "brewing area" 72.

While the pack is being transported, the lower sealing sheet 16 or 16a, which is provided with a lug 19, is removed from the container 15. To effect this, a clamping device 73 is provided, to grip the forwardly projecting lug 19. The clamping device grips the lug 19 and thus holds back the sealing sheet 16 or 16a while the pack is conveyed further. In this region, a conveyor 74 is provided above the path of motion of the pack. This conveyor grips the pack at the back by means of engaging members. This conveyor 74 transports the pack 10 until it is located under the hot water heater 45.

The clamping device 73 operates automatically. The lug 19 moves under a clamping jaw 76, attached to a spring loaded, pivotable arm 75. The clamping jaw 76 is forced against a fixed counter jaw 77 by the continued movement of the pack 10. The clamped lug 19 pulls the sealing sheet 16 or 16a from the container 15.

The coffee is prepared in the brewing area in the way described. The only deviation from the embodiment according to FIGS. 1–3 is that only a single nozzle 78 is provided. This is lowered relative to the stationary hot water heater 45 until it penetrates the upwardly facing surface of the container 15.

I claim:

1. A method for the preparation of individual portions of a filtered coffee beverage from ground roast coffee in a machine having a hot water heater, comprising:
    a. packaging ground roast coffee in individual, aroma sealed, filter packs each pack comprising a container having an open, downwardly facing side closed off by a sealing sheet removably attached thereto, a filter layer mounted within the container at a distance from the sealing sheet disposed between said sheet and the coffee and containing an amount sufficient for one drink,
    b. storing the individual packs in a storage station of the machine,
    c. selecting the individual packs, as required from the storage area,
    d. conveying the selected packs, one at a time, to a brewing station,
    e. removing the sealing sheet from the pack,
    f. piercing the upper portion of the pack and introducing hot water into the pack to brew the ground coffee therein, said filter layer maintaining the coffee in the pack during brewing and the brewed coffee discharging through said filter layer and
    g. directing the discharged coffee from the pack directly into a serving container.

2. The method of claim 1, wherein the sealing sheet disposed over a downwardly facing opening of the pack is removed from the pack while the pack is being conveyed to the brewing station.

3. The method of claim 2, wherein one edge of the sealing sheet is gripped by stationary gripping means while the pack is conveyed further to remove the sealing sheet from the pack.

4. The method of claim 1, wherein the hot water is introduced into the pack via at least one nozzle connected to the hot water heater, said nozzle penetrating the upper portion of the pack.

5. The method of claim 1 wherein only a portion of the necessary hot water for brewing is introduced into the pack at first and, after a predetermined brewing period, the remainder of the water is introduced.

* * * * *